Feb. 25, 1969 W. W. WARD 3,429,478
DRINKING ATTACHMENT FOR CONTAINERS
Filed Dec. 7, 1967
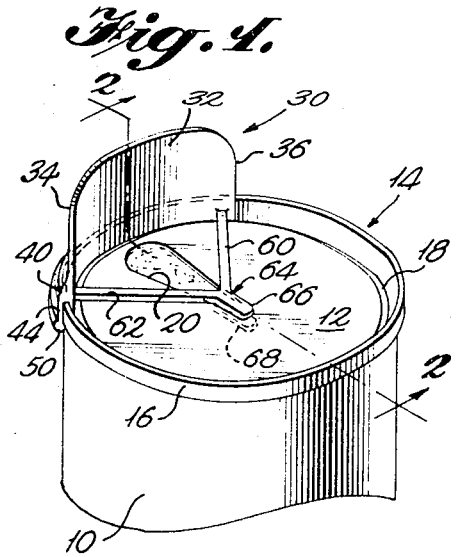
Fig. 1.
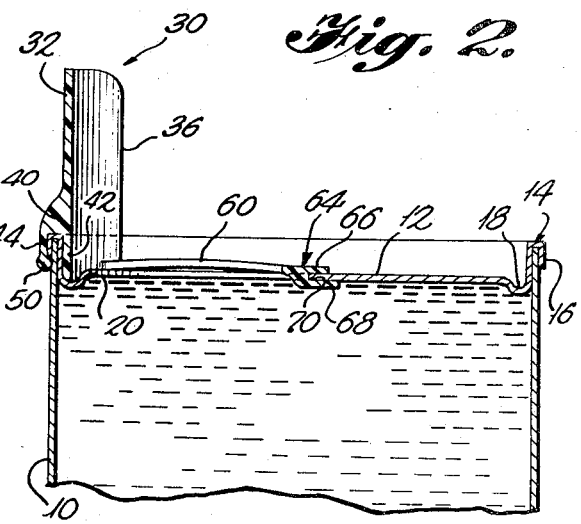
Fig. 2.
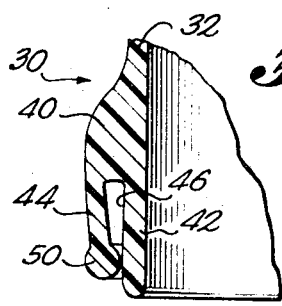
Fig. 4.
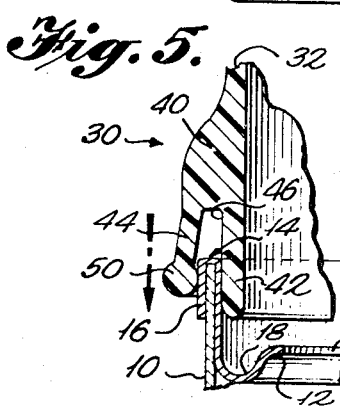
Fig. 5.
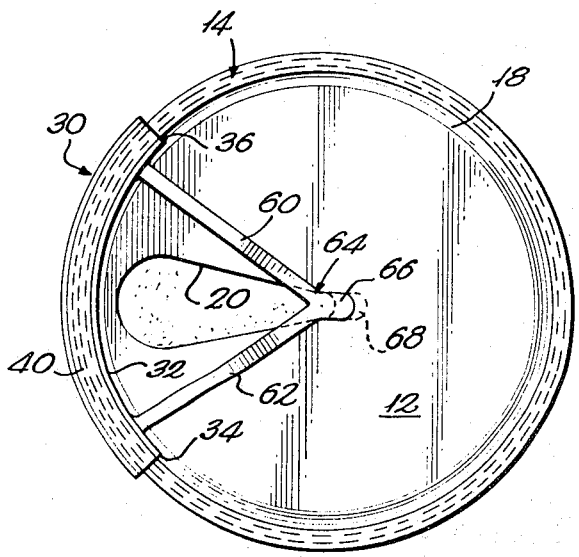
Fig. 3.
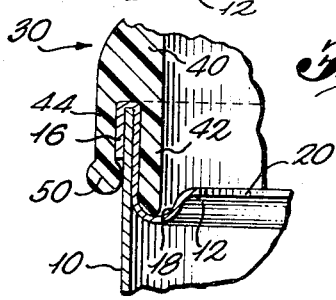
Fig. 6.
INVENTOR
William W. Ward
BY Shoemaker and Mattare
ATTORNEYS

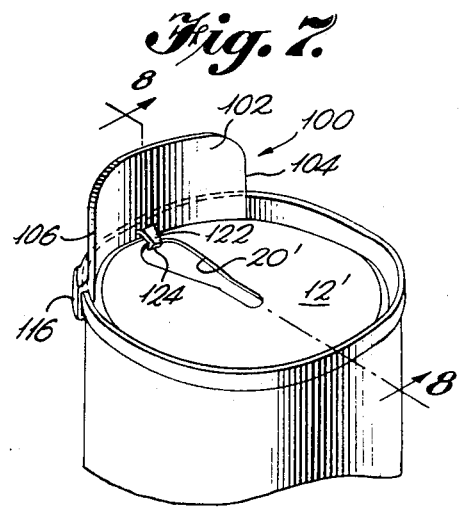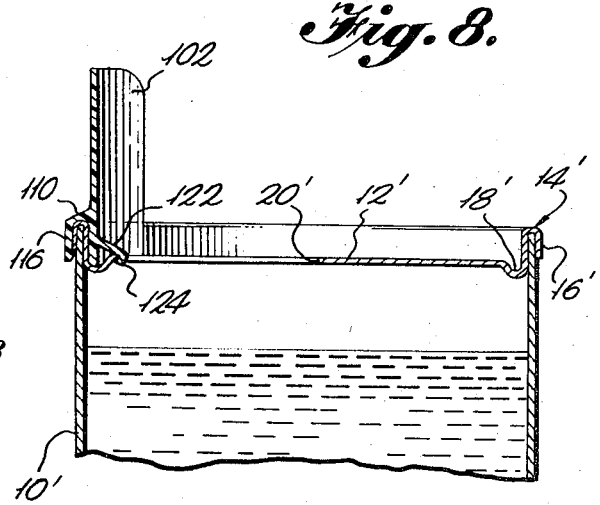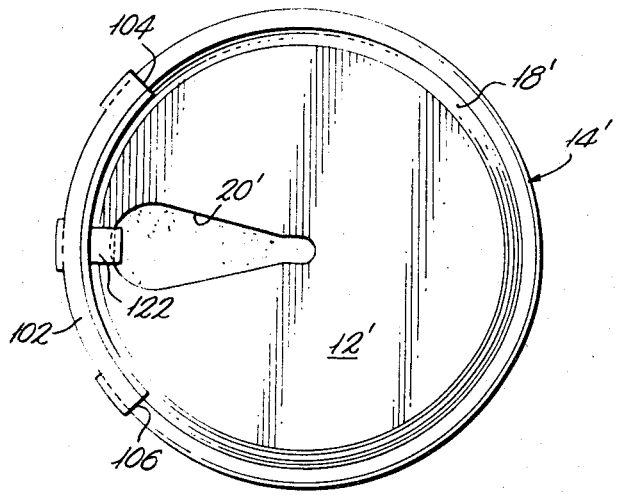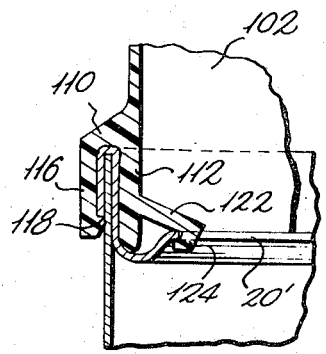

3,429,478
Patented Feb. 25, 1969

3,429,478
DRINKING ATTACHMENT FOR CONTAINERS
William W. Ward, 7520 Maple Ave., Apt. 712,
Takoma Park, Md. 20012
Continuation-in-part of application Ser. No. 669,799,
Sept. 27, 1967. This application Dec. 7, 1967, Ser.
No. 693,043
U.S. Cl. 220—90.2　　　　　　　　　　　　　　1 Claim
Int. Cl. A47g 19/22

ABSTRACT OF THE DISCLOSURE

A drinking attachment is adapted to be mounted on the end of a beverage can having a lip therearound and a pour hole therethrough. The attachment includes a mouth engaging portion connected with a container engaging portion which is attached to the lip of the container, while an offset portion is at least partially received in the pour hole of the container to hold the attachment firmly in position.

---

The present application is a continuation-in-part of U.S. patent application Ser. No. 669,799, filed Sept. 22, 1967, now abandoned and entitled, Drinking Attachment for Containers, which is currently pending.

Background of the invention

The drinking attachment according to the present invention is adapted to be readily attached to containers such as particularly beverage cans and the like having a lip on the end thereof and wherein the end wall of the container has a pour hole therethrough. The pour hole may either be formed by a conventional manually operated container opener which is adapted to punch one or more holes in an end wall of the container, or the pour hole may be preformed and provided with a manually removable portion as is now conventionally employed for example in beer cans and the like.

Drinking attachments have been provided for beverage containers in the prior art as shown for example in U.S. Patent No. 2,782,614 wherein the attachment extends completely around the container in order to effect a seal therewith and to remain in operative position thereon. This type of arrangement is relatively expensive and bulky, and as shown in the patent comprises a construction wherein it is necessary to employ different parts formed of different materials.

A further difficulty with an arrangement such as shown in the aforementioned U.S. patent is the fact that it may not provide an effective seal with the associated container, and furthermore it may not be adequately held in place when force is applied to the attachment when it is pressed against a person's mouth when drinking therefrom.

An additional problem with such prior art structures is the fact that they are not readily adaptable for use with containers of slightly different size, nor can they readily conform to irregularities in the configuration of the container.

Summary of the invention

The present invention provides an arrangement wherein the attachment is of an integral one-piece construction and is of a relatively small size and is adapted to extend only partially about the end of an associated container. This substantially reduces the expense of the attachment.

The attachment of the present invention provides a unique sealing interengagement with the associated container so as to provide a double seal so as to assure that no leakage will occur between the attachment and the container when liquid is being dispensed therefrom. In addition, the attachment of the present invention includes a novel offset portion which is adapted to be received at least partially in the pour hole in an end wall of the container so as to firmly anchor the attachment in place so that there is virtually no possibility that the attachment will be displaced from its desired operative position when in use.

In a modified form of the invention, the container engaging portion includes three spaced resilient leg portions adapted to engage the outer surface of the container. By providing such spaced resilient portions, the attachment which itself is formed of a resilient material such as plastic or the like is adapted to fit onto containers of slightly different size, and additionally, is adapted to readily conform to irregularities in the configuration of the container.

An object of the present invention is to provide a new and novel drinking attachment for containers which is of simple, inexpensive construction, yet provides an effective seal with an associated container and is firmly anchored in place while in use.

Brief description of the drawing

FIG. 1 is a top perspective view of an end of a container having the attachment of the present invention operatively associated therewith;

FIG. 2 is a sectional view on an enlarged scale taken substantially along line 8—8 of FIG. 7 looking in the direction of the arrows;

FIG. 3 is a top view of the structure shown in FIG. 2;

FIG. 4 is an enlarged sectional view illustrating the details of construction of a portion of the attachment;

FIG. 5 is a view similar to FIG. 4 illustrating the manner in which this portion of the structure is mounted on the lip at the end of the associated container;

FIG. 6 illustrates the structure as shown in FIGS. 4 and 5 in its final assembled operative position on the associated container;

FIG. 7 is a top perspective view of the end of a container having a modified form of the invention operatively associated therewith;

FIG. 8 is a sectional view on an enlarged scale taken substantnially along line 8—8 of FIG. 7 looking in the direction of the arrows;

FIG. 9 is a top view of the structure shown in FIG. 8;

FIG. 10 is an enlarged view of a portion of the structure shown in FIG. 8; and

FIG. 11 is a front view of the lower portion of the attachment shown in FIGS. 7–10.

Description of the preferred embodiments

Referring now to the drawing wherein like reference characters designate corresponding parts throughout the views, as seen in FIGS. 1–3, a more or less conventional beverage container formed of metal such as a beer can is illustrated and includes a substantially cylindrical side wall 10 and an end wall 12, the side and end walls being connected by what may be termed a lip construction 14 at the end of the container. A depending flange 16 of the end closure extends peripherally around the upper end of the side wall 10 as illustrated. The end wall also includes a recessed portion 18 which extends all the way around the end wall adjacent to the side wall as seen in FIG. 2.

The end wall is provided with a pour hole 20 which is illustrated as being of the type which is preformed in the end wall and wherein a removable portion of the end wall is manually removed when it is desired to dispense the beverage from the container as is the current vogue in beer cans and the like.

The drinking attachment of the present invention is indicated generally by reference numeral 30 and comprises a one-piece construction which preferably may be a molded plastic construction, the attachment being formed of any suitable plastic material. It is evident that the attachment may be formed of other materials, and it is desired that the material be relatively rigid, and yet at the same time exhibit resilient characteristics for a purpose hereinafter explained.

The attachment includes a mouth engaging portion 32 of generally arcuate configuration extending through an arc which is illustrated as being somewhat greater than 45°. The exact extent of the arc through which the mouth engaging portion extends may be varied, but in any event is less than semicircular and sufficiently great so that liquid will not tend to spill around the side edges 34 and 36 thereof when drinking therefrom.

A container engaging portion is formed integral with the lower part of the mouth engaging portion and includes a portion 40 of enlarged thickness including a depending inner leg portion 42 which is adapted to fit against the inner surface of the lip formed at the end of the container and to extend down into the recess 18 in the end wall of the container.

The container engaging portion also includes a depending resilient leg portion 44 which is spaced from the inner leg portion 42 to define a recess 46 therebetween which is adapted to receive the lip on the end of the associated container. This recess 46 extends through an arc the same as that of the lip on the end of the container so as to snugly fit on said lip.

The lower end of the resilient leg portion is provided with an integral bead 50 on the peripheral edge thereof for a purpose hereinafter described.

The drinking attachment also includes an integral offset portion comprising a pair of spaced angularly related arms 60 and 62 which extend radially inwardly from the inner surface of the attachment and are interconnected with a clamping portion 64.

This clamping portion 64 as seen most clearly in FIG. 2 includes an upper portion 66 and a spaced lower portion 68 defining a slot 70 therebetween for receiving a portion of the end wall of the container adjacent one end of the pour hole 20 formed therethrough. It will be noted that the lower portion 68 is of greater length than the upper portion 66 and extends therebeyond for a purpose hereinafter described.

When it is desired to mount the drinking attachment of the present invention in operative position on the end of a container, the pour hole is first formed whereupon the clamping portion 64 is mounted in operative position by sliding the lower portion 68 of the clamping portion under the end wall of the container at one end of the pour hole, the longer length of the lower portion 68 facilitating the mounting of the clamping portion in operative position as illustrated in FIG. 2.

After the clamping portion has been mounted in the position shown in FIG. 2, the container engaging portion is then forced downwardly so that the resilient leg portion 44 thereof is expanded outwardly as seen in FIG. 5 to fit over the lip 14 of the container, and the container engaging portion is then moved downwardly into the operative position shown in FIG. 6.

As seen in FIG. 6, the inner leg portion 42 of the container engaging portion fits snugly against the inwardly facing surface of the lip on the container and fits downwardly within the recess 18 in the end wall of the container. The resilient leg portion 44 fits snugly against the outwardly facing surface of the lip, and the bead 50 formed at the lower portion of leg portion 44 is adapted to snap under the lower edge of the flange 16 on the container to securely lock the attachment in place.

This arrangement also effectively provides a double seal between the attachment and the container since the inner leg portion 42 of the attachment provides a seal with the inwardly facing surface of the lip of the container, and the resilient leg portion 44 provides a seal with the outwardly facing surface of the lip of the container, while the bead 50 further provides a seal against the side wall 10 of the container. This ensures that there will be no leakage between the container and the attachment.

The clamping portion 64 of the attachment fits partially within the pour hole in the end of the container, and the dimensions of the arms 60 and 62 extending between the clamping portion 64 and the inwardly facing surface of the attachment is such that when the attachment is mounted in the operative position shown in FIG. 2, these arms 60 and 62 will be bowed slightly upwardly so as to maintain the attachment securely in operative position by constantly exerting force so as to urge the clamping portion of the attachment toward the associated part of the end wall of the container and to urge the remaining portion of the attachment toward the associated lip of the container whereby there is virtually no chance of the attachment being accidentally displaced from its operative position.

It is apparent that after the attachment has been used, it may then be readily manually removed from the container when desired and reused at will.

Referring now to FIGS. 7–11 of the drawings inclusive, a modified form of the invention is illustrated. In these figures, the device is illustrated as operatively associated with a container of the same construction as that previously described, and accordingly the container components have been given the same reference numerals primed as previously employed.

The drinking attachment of this form of the invention is indicated generally by reference numeral 100 and as in the previous form of the invention comprises a one-piece construction which is preferably a molded plastic construction. Of course, this material should be relatively rigid yet at the same time exhibit resilient characteristics.

The attachment includes a mouth engaging portion 102 which is generally arcuate in configuration and extends through an arc which is less than semicircular and sufficiently great so that liquid will not spill around the side edges 104 and 106 thereof.

A container engaging portion is formed integral with the lower part of the mouth engaging portion and includes a portion 110 of enlarged thickness including a depending inner leg portion 112 which is adapted to fit against the inner surface of the lip formed at the end of the container and to extend down into the recess 18' in the end wall of the container.

The container engaging portion also includes a plurality of depending resilient leg portions 116, these leg portions being illustrated as being three in number and substantially equally spaced from one another. Each of these leg portions is spaced from the inner leg portion 112 to define recesses therebetween adapted to receive the lip on the end of the associated container. Each of these recesses is arcuate so as to conform to the outer shape of the container.

The lower end of each of the resilient leg portions is provided with an integral bead 118 on the inner peripheral edge thereof adapted to snap under the lower edge of the flange 16' on the container to securely lock the attachment in place.

By providing three separate spaced resilient leg portions, and further by forming the attachment of a resilient material such as plastic or the like, the attachment is adapted to be fitted on containers of slightly different size, and the spacing of the resilient leg portions enables the attachment to readily conform to any irregularities of the container.

The drinking attachment also includes an integral offset portion including a first portion 122 which is angularly disposed with respect to the inner leg portion 112 as seen most clearly in FIG. 10. The offset portion includes a further depending portion 124 integral with portion 122 and extending angularly therefrom. As seen in FIG. 10, when the attachment is in operative position, the portions 122 and 124 cooperate to engage a portion of the end wall 12' of the container, portion 124 of the offset portion extending downwardly through the pour hole thereof.

It is also apparent that in this form of the invention the outer resilient leg portions are adapted to snap into place as seen in FIG. 10 with the beads on the resilient arms snapping into place beneath the flange 16' of the container.

As in the previous modification, the attachment is simply pressed downwardly into operative position as shown in FIGS. 7–10 whereupon the device is securely locked in its operative position. When it is desired to remove the attachment, it can simply be lifted away from the operative position illustrated.

I claim:
1. A drinking attachment for cylindrical containers of the type including a lip on the end thereof and wherein the end wall of the container has a pour hole therethrough with its outer edge in spaced relation to said lip, said attachment consisting of a one-piece body construction of generally arcuate configuration and extending through an arc defining less than a semicircle in cross-section, said body having an arcuate free edge portion adapted to be positioned on the inner side of said lip, the outer convex side of said portion having a plurality of spaced downwardly extending resilient leg portions with a locking bead on their free ends adapted to contact the outer side of said lip and the inner concave side of said free edge portion having an integral downwardly and inwardly extending resilient leg portion positioned medially of said body and with its free end terminating in a downwardly and outwardly extending hook portion spaced inwardly of said free edge portion, for hook engagement with said outer edge of said pour hole.

References Cited

UNITED STATES PATENTS

| 1,587,934 | 6/1926 | Bartlett | 222—570 |
| 2,075,721 | 3/1937 | Hommel | 220—90.6 |
| 2,158,502 | 5/1939 | Harrison | 222—90 |
| 2,552,318 | 5/1951 | Hartmann | 220—90.6 |
| 2,609,968 | 9/1952 | Ream | 222—90 |
| 2,839,229 | 6/1958 | Scheswohl | 222—567 |
| 3,122,288 | 2/1964 | Lee et al. | 222—569 |
| 3,197,089 | 7/1965 | Michael. | |

RAPHAEL H. SCHWARTZ, *Primary Examiner.*